(12) United States Patent
Steele et al.

(10) Patent No.: US 6,782,466 B1
(45) Date of Patent: Aug. 24, 2004

(54) ARRANGEMENT AND METHOD FOR ACCESSING DATA IN A VIRTUAL MEMORY ARRANGEMENT

(75) Inventors: James Crawford Steele, Chandler, AZ (US); Desi Rhoden, Phoenix, AZ (US); George Crouse, Chandler, AZ (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/449,273

(22) Filed: Nov. 24, 1999

(51) Int. Cl.[7] .............................................. G06F 12/00
(52) U.S. Cl. ............................ 711/209; 711/5; 711/170
(58) Field of Search ....................... 365/189.01, 189.04, 365/230.01, 230.03, 238.5; 711/5, 6, 147, 153, 154, 170, 171, 173, 202, 209; 712/300

(56) References Cited

U.S. PATENT DOCUMENTS

| | | | |
|---|---|---|---|
| 4,779,144 A | * 10/1988 | Dischert et al. | ............... 386/31 |
| 5,632,021 A | 5/1997 | Jennings et al. | |
| 5,691,949 A | * 11/1997 | Hively et al. | .......... 365/230.03 |
| 5,706,407 A | 1/1998 | Nakamura et al. | |
| 5,761,694 A | 6/1998 | Rao | |
| 5,787,267 A | 7/1998 | Leung et al. | |
| 5,940,342 A | * 8/1999 | Yamazaki et al. | ..... 365/230.03 |
| 6,000,007 A | * 12/1999 | Leung et al. | ............... 711/105 |
| 6,195,107 B1 | * 2/2001 | Iverson | ....................... 711/203 |
| 6,233,195 B1 | * 5/2001 | Yamazaki et al. | ..... 365/230.03 |
| 6,272,613 B1 | * 8/2001 | Bouraoui et al. | ........... 711/204 |

FOREIGN PATENT DOCUMENTS

GB 2256293 12/1992

* cited by examiner

*Primary Examiner*—Donald Sparks
*Assistant Examiner*—Christian P. Chace
(74) *Attorney, Agent, or Firm*—Michael J. Ure

(57) ABSTRACT

A memory access approach optimizes memory address mapping for accessing data in a virtual memory arrangement wherein multiple banks of data are opened at once. One specific implementation is directed to a process of accessing data in a plurality of addressable banks of memory cells. The process involves accessing the memory cells by addressing arrays in the banks via column and row bits, and directing the address and control signals so that the addressable column address and row address bits are selected with a lower order group of the address bits directed to select the column address bits, and the next highest group of the address bits directed to select bank address bits. The next highest group of the address bits are directed to select the row address bits.

2 Claims, 4 Drawing Sheets

FIG.3

New MA Map for Virtual Page Size of 4KB (X86)
Memory Address (MA)

```
      BA1 BA0 12 11 10 9 8 7 6 5 4 3 2 1 0
Row        A12 A11 A27 A26 A25 A24 A23 A22 A21 A20 A19 A18 A17 A16 A15
Col        A12 A11*A14 A28 P   A14 A13*A10 A9 A8 A7 A6 A5 A4 A3
```

FIG.5

New MA Map for Virtual Page Size of 8KB (DEC Alpha)
Memory Address (MA)

```
      BA1 BA0 12 11 10 9 8 7 6 5 4 3 2 1 0
Row        A13 A12 A28 A27 A26 A25 A24 A23 A22 A21 A20 A19 A18 A17 A16
Col        A13 A12*A15 A29 P   A15 A14*A11 A10 A9 A8 A7 A6 A5 A4
```

_ denotes varying cpu address bits based on dram size
* Swapped if sdram has more than 8 columns

ARRANGEMENT AND METHOD FOR ACCESSING DATA IN A VIRTUAL MEMORY ARRANGEMENT

FIELD OF THE INVENTION

This invention relates to accessing data in memory arrangements and, more particularly, to data processing systems and methods involving data access in virtual memory for which multiple banks of data are concurrently opened.

BACKGROUND OF THE INVENTION

In recent years, the semiconductor industry has realized tremendous advances in technology which have permitted dramatic increases in circuit density and complexity, and equally dramatic decreases in power consumption and package sizes. Present semiconductor technology now permits single-chip microprocessors with many millions of transistors, operating at speeds of hundreds of MIPS (millions of instructions per second) to be packaged in relatively small, air-cooled semiconductor device packages.

A by-product of such high-density and high functionality in semiconductor devices has been the demand for increased fast data-storage capability. For many applications, this has translated to an increased number of memory cells in a given chip size (or real estate area). Even with such higher-density memory circuits, there are still needs to increase the data processing capacity of CPUs, and this in turn places the demands on the associated resources, such as the system's read-write memory. This is particularly true with certain CPUs, such as Very Long Instruction Word (VLIW) and Reduced Instruction Set Computing (RISC) processors, that require more memory capacity than the more widely used Complex Instruction Set Computing (CISC) CPUs and also require higher memory bandwidth.

One common approach for increasing the data processing capacity of a CPU is to employ virtual memory and memory address mapping. In systems that employ virtual memory, when the CPU is accessing read-write memory (e.g., DRAM), it is important for DRAM subsystems to allow fast access to the whole virtual memory page, because the code/data in that page is likely to be related and accessed relatively often. It is not important that DRAM subsystems be configured for optimal access times for accesses outside of the virtual memory page, since the DRAM controller would possibly permit such accesses anywhere in physical memory without knowledge as to where such accesses would ultimately be made.

In many virtual memory systems, the size of an open DRAM page is not as big as a virtual memory page. This relationship is dependent upon the organization of the memory in the system. In such systems where the open DRAM page size is smaller, if the memory address (MA) map does not have the bank address (BA) mapping to the next highest address bits, a contiguous open DRAM page as big as a virtual page would not be viable. For example, if the DRAM page side is 2 K bytes, but the virtual page size is 4 K bytes (or larger), CPU-to-DRAM performance is not optimized without the ability to use an open DRAM page as big as a virtual page. Further, in systems where a bank of DRAM is capable of supporting a page size as big as the virtual memory page, CPU-to-DRAM performance is degraded if multiple DRAM pages are mapped such that portions of them map onto a single virtual memory page.

Accordingly, there is a need for a memory access approach that permits multiple banks of data to be concurrently opened and that improves CPU-to-DRAM performance for virtual memory access.

SUMMARY

According to various aspects of the present invention, embodiments thereof are exemplified in the form of methods and arrangements for accessing data in a virtual memory arrangement wherein multiple banks of data are opened at once. One specific implementation is directed to a process of accessing storage data in a computer system having address and control signals for selecting data, components and/or devices. The process involves providing a plurality of addressable banks of memory cells; accessing the memory cells by addressing arrays in the banks via column and row bits; and directing the address and control signals so that the addressable column address and row address bits are selected with a lower order group of the address bits directed to select the column address bits, the next highest group of the address bits directed to select bank address bits, and the next highest group of the address bits directed to select the row address bits.

Another specific implementation of the present invention is directed to a computer system configured to access data in a memory arrangement. The system includes a computer system arrangement comprising: a CPU circuit; a memory arrangement arranged in a plurality of addressable banks of memory cells and having arrays in the banks addressable via column and row bits for accessing the memory cells; and a memory mapping circuit adapted to direct address and control signals generated by the CPU circuit to select the addressable column address and row address bits with a lower order group of the CPU address bits directed to select the column address bits, the next highest group of the CPU address bits directed to select bank address bits, and the next highest group of the CPU address bits directed to select the row address bits.

The above summary is not intended to provide an overview of all aspects of the present invention. Other aspects of the present invention are exemplified and described in connection with the detailed description.

BRIEF DESCRIPTION OF THE DRAWINGS

Various aspects and advantages of the present invention will become apparent upon reading the following detailed description of various embodiments and upon reference to the drawings in which:

FIG. 3 illustrates a memory access mapping for the data access arrangement of FIG. 2B;

FIG. 5 illustrates a memory access mapping for the data access arrangement of FIG. 4B.

Figure 1:
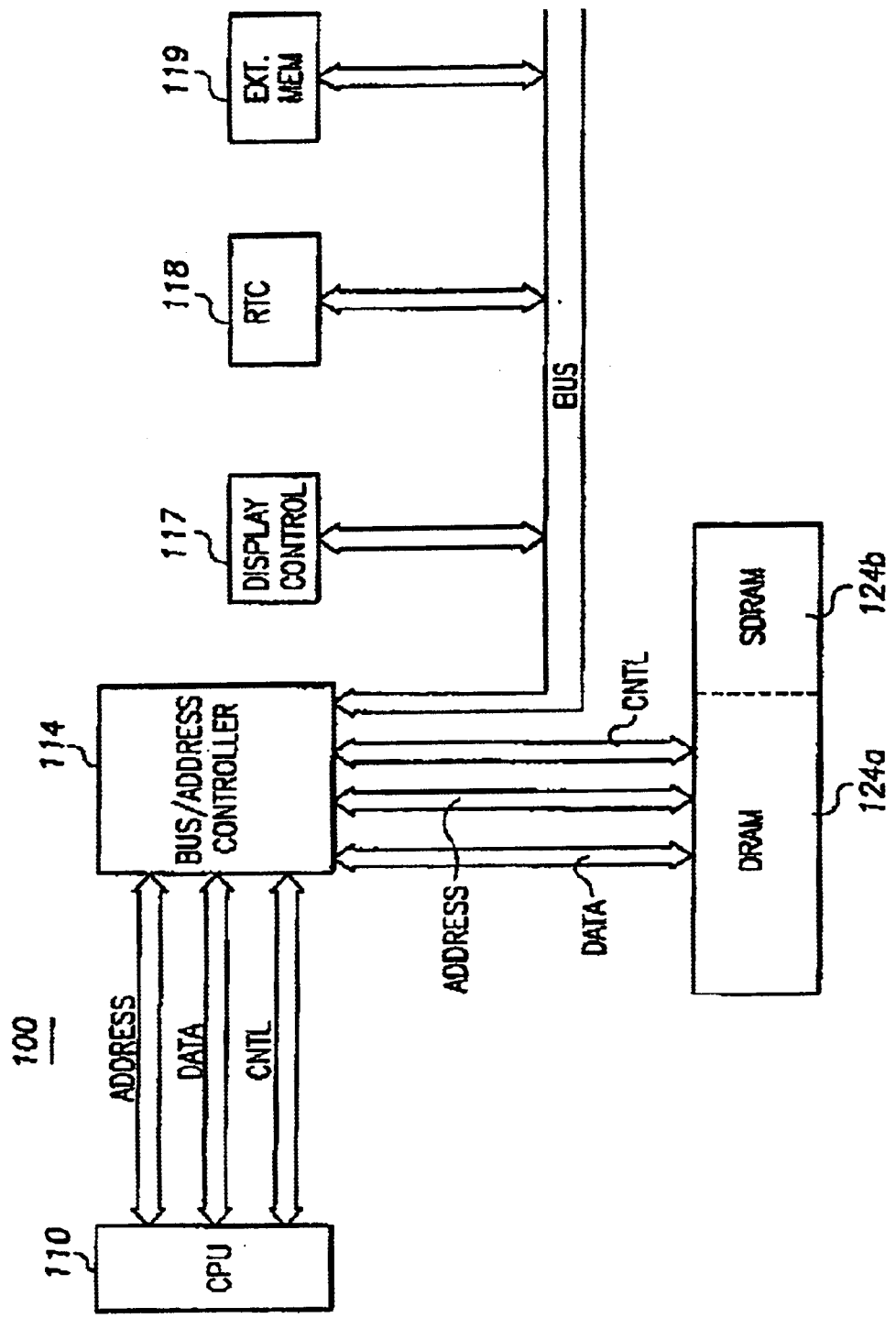
FIG. 1 is a computer system including a data access arrangement implemented according to an example embodiment of the present invention.

While the invention is amenable to various modifications and alternative forms, specifics thereof have been shown by way of example in the drawings and will be described in detail. It should be understood, however, that the intention is not to limit the invention to any particular embodiment described. On the contrary, the invention is to cover all modifications, equivalents, and alternatives falling within the spirit and scope of the invention as defined by the appended claims.

DETAILED DESCRIPTION

The present invention may be applied to a variety of computer arrangements and has been found to be particularly advantageous for use in connection with memory mapping arrangements in which multiple banks of data are concurrently opened. While the present invention is not necessarily so limited, an appreciation of various aspects of the invention may be obtained through a discussion of various examples in such an environment.

According to a first example embodiment of the present invention, a memory mapping approach uses the lowest CPU address bits mapped to the DRAM column address bits, and the next highest CPU address bit(s) mapped to the bank address (BA) bits. Higher CPU address bits map to the row address bits, etc. The BA bits are thus placed typically at the 2 K or 4 K boundaries so that when the multiple pages are opened, they are contiguous and tantamount to a single larger DRAM page that matches the size of the virtual page. With this approach, the DRAM controller advantageously has the BA bits sitting right "above" the column address bits; which is realized by using multiple open pages that are contiguous and that span the virtual memory page. Consequently, DRAM accesses are allowed anywhere within the virtual memory page without having to repeatedly open and close DRAM pages as accesses are made throughout the virtual memory page.

In another example embodiment, the system further includes a bank of SDRAM (synchronous DRAM) capable of supporting a page size as big as the virtual memory page. This arrangement is accommodated in the first example embodiment by having different (e.g., higher) address bits mapped to the BA bits. This approach permits a single DRAM page to be mapped to a virtual memory page without one half of each of two DRAM pages being mapped to a single virtual memory page.

Turning now to the drawings, FIG. 1 illustrates a data access arrangement 100 implemented according to an example embodiment of the present invention.

The arrangement 100 is intended to typify one of various types of CPU-based data processors that can embody, and benefit from the present invention. For example, the arrangement 100 can be a motherboard for a PC.

The arrangement 100 includes a CPU 110, which can be a single-processor or multi-processor architecture, a bus controller 114, peripherals including a display controller 117, a real-time clock 118, an external memory device 119, and local memory 124 including DRAM 124a and SDRAM 124b. The CPU 110 communicates with the bus controller 114 via address, data and control signaling as defined by the specifications of the CPU 110 and/or the arrangement 110.

In accordance with instructions from the CPU 110, the bus controller 114 maps addresses received from the CPU 110 to designated banks of data within DRAM 124a and/or SDRAM 124b. Each of the DRAM 124a and SDRAM 124b includes a plurality of memory cell arrays accessed and refreshed using mapped address, signals and control signals to designated timing and to determine whether an access is a "read-from" access or "write-to" access. In other applications, the bus controller 114 is incorporated either as part of the CPU 10 or as a separate circuit, depending on the application. The skilled artisan will appreciate that the architecture illustrated in FIG. 1 is merely one of many example approaches; one conventional variation includes a PCI (peripheral connect interface) bridge coupled to the bus and permitting the CPU 110 to communicate with additional peripheral devices using an accepted PCI communication protocol.

Figure 2B:
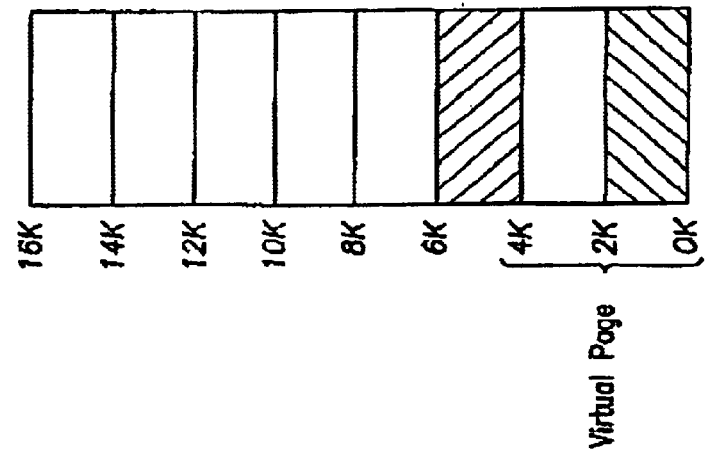
FIGS. 2A and 2B illustrate data access arrangements for a first DRAM page size, according to an example embodiment of the present invention and according to the prior art, respectively.
Figure 2A:
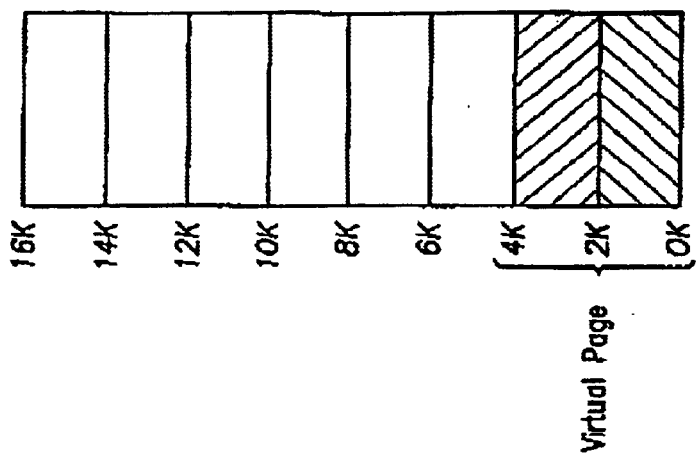

FIGS. 2A and 3 illustrate a data access arrangement that is implemented according to an example embodiment of the present invention and is useful in connection with the architecture illustrated in FIG. 1. In this example, the bus controller 114 of FIG. 1 can be used to coordinate mapping to the memory 124, to the other peripherals 117–119 and, if present, to the PCI bridge. To map to the memory 124, the bus controller 114 includes configuration decoding logic adapted to generate the starting and ending addresses for each DRAM memory bank, per the designed or programmed configuration register settings within the bus controller 114. The register settings establish the bank size and are used to generate signals that indicate selection of one or more banks.

Another example implementation uses a computer system, such as an Intel X86-type CPU, configured for a virtual page size of 4 Kbytes. Memory specifications for such a system can include a minimum SDRAM memory of 16 Mbytes, and a maximum supported SDRAM memory of 512 Mbytes. FIGS. 2A and 2B illustrate a virtual page size comparison for such a system with an SDRAM memory having eight column address lines, which corresponds to an SDRAM page size of 2 Kbytes. Illustrated in FIG. 2B is the conventional mapping in which bank address bit BA0 is mapped to address bit A12. Mapping in accordance with an implementation of the present invention, as shown in FIG. 2A, has bank address bit BA0 mapped to address bit A11 to open the virtual page from 0–4 Kbytes.

FIG. 3 illustrates a memory access mapping for the data access arrangement of FIG. 2A, which is unlike the conventional mapping approach (FIG. 2B), the memory access mapping of FIG. 2A has the lowest address bits designated for address column bits, and the next highest bits (A11 and A12) designated for the bank address bits BA0 and BA1 (to select up to four banks of DRAM data). Th next highest address (>A12) are designated for row address bits. The "P" symbol under address bit A10 in FIG. 3, consistent with JEDEC recommendations, is an auto-precharge bit and is used when two banks of data are concurrently opened.

Figure 4B:
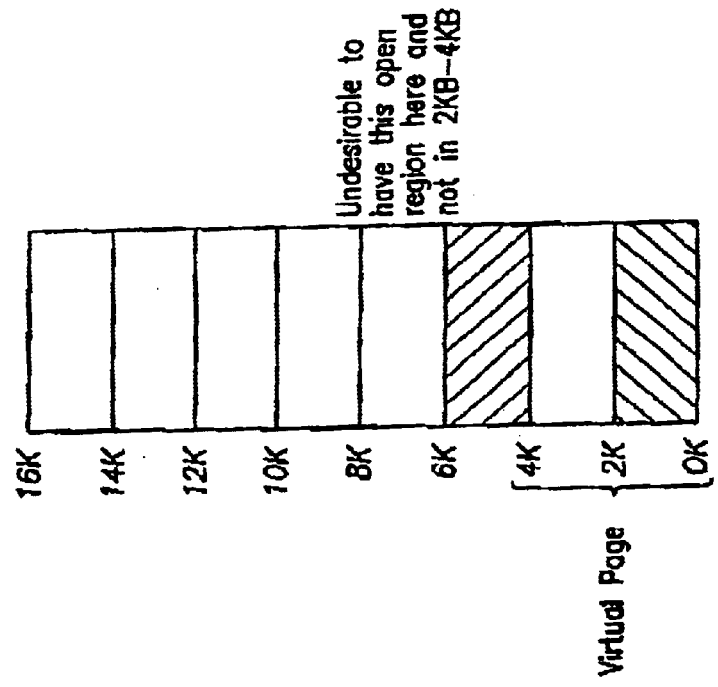
FIGS. 4A and 4B illustrate data access arrangements for a second DRAM page size, according to an example embodiment of the present invention and according to the prior art, respectively.
Figure 4A:
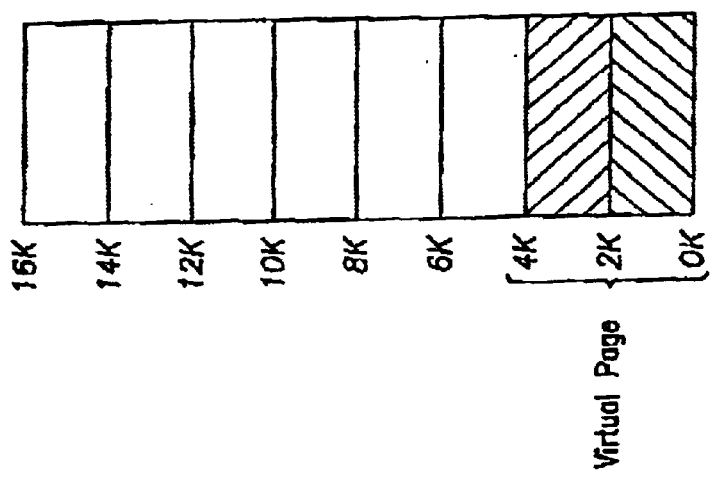

FIGS. 4A and 4B illustrate a virtual page size comparison for such a system with an SDRAM page size of 4 Kbytes and with nine column address lines to span a whole virtual page. It is disadvantageous to map BA0 to A11 (as described in connection with FIGS. 2A and 3) because such a mapping would dedicate portions of both 4 KDRAM pages to a single 4 K virtual page in DRAM. FIG. 4A illustrates the desirous mapping in which designating BA0 and BA1 to A12 and A13 permits each of the 4 Kbytes of open DRAM to be independently assigned to different virtual pages. FIG. 4B illustrates the disadvantageous mapping of BA0 to A11, in which the two banks of virtual DRAM must be opened to map to a single virtual page.

FIG. 5 illustrates a memory access mapping for another data access arrangement. Similar to the mapping approach of FIG. 2A, this memory access mapping has the lowest address bits designated for address column bits, the next highest bits (A12 and A13) designated for the bank address bits BA0 and BA1, and the next highest address bits designated for row address bits.

The various embodiments described above are provided by way of illustration only and are not intended to limit the invention. Those skilled in the art will readily recognize various modifications and changes that may be made to the present invention without strictly following the example embodiments and applications illustrated and described herein. Fox example, implementation is directed to a computer system, such as the DEC Alpha CPU, configured for a virtual page size of 8 Kbytes. Such variations fall within the scope of the present invention as set forth in the following claims.

What is claimed is:

1. A computer system, comprising:

a digital processing means for digitally processing data;

a memory arrangement arranged in a plurality of addressable banks of memory cells and having arrays in the banks addressable via column and row bits for accessing the memory cells; and logic means for directing address and control signals generated by the digital processing means and selecting the addressable column address and row address bits with a lower order group of the address bits directed to select die column address bits, the next highest group of the address bits directed to select bank address bits, and the next highest group of the address bits directed to select the row address bits, wherein the memory mapping circuit is adapted for read-write memory with column address lines corresponding to a memory arrangement page size that is smaller than a virtual page size, wherein the read-write memory is a DRAM and wherein the memory mapping circuit is adapted for read-write memory with column address lines corresponding to a set of contiguous DRAM pages that map entirely into a virtual page.

2. A method for accessing data in a computer system having address and control signals for selecting, comprising:

providing a plurality of addressable banks of memory cells;

accessing the memory cells by addressing arrays in the banks via column and row bits; and directing the address and control signals so that the addressable column address and row address bits are selected with a lower order group of the address bits directed to select the column address bits, the next highest group of the address bits directed to select bank address bits, and the next highest group of the address bits directed to select the row address bits, wherein the memory mapping circuit is adapted for read-write memory with column address lines corresponding to a memory arrangement page size that is smaller than a virtual page size wherein accessing includes virtually accessing contiguous pages of memory concurrently.

* * * * *